(12) United States Patent
Heisler et al.

(10) Patent No.: US 7,671,125 B2
(45) Date of Patent: Mar. 2, 2010

(54) PROCESS FOR THE CONTINUOUS PREPARATION OF HIGH-VISCOSITY SILICONE COMPOSITIONS

(75) Inventors: Manfred Heisler, Emmerting (DE); Johann Schuster, Emmerting (DE); Alois Schlierf, Burghausen (DE); Fridolin Stary, Burghausen (DE)

(73) Assignee: Wacker-Chemie GmbH, Munich (DE)

( * ) Notice: Subject to any disclaimer, the term of this patent is extended or adjusted under 35 U.S.C. 154(b) by 381 days.

(21) Appl. No.: 10/802,455

(22) Filed: Mar. 17, 2004

(65) Prior Publication Data

US 2004/0192809 A1 Sep. 30, 2004

(30) Foreign Application Priority Data

Mar. 27, 2003 (DE) ................. 103 13 941

(51) Int. Cl.
*B29B 7/48* (2006.01)
(52) U.S. Cl. .................. 524/492; 366/75; 366/76.1; 366/78; 366/91; 366/155.1
(58) Field of Classification Search .............. 524/492; 425/203, 205; 366/75, 76.1, 78, 91, 155.1, 366/297–301
See application file for complete search history.

(56) References Cited

U.S. PATENT DOCUMENTS

| | | | |
|---|---|---|---|
| 4,797,080 A | | 1/1989 | Wanninger |
| 5,198,171 A | * | 3/1993 | Kasahara et al. ........ 264/211.23 |
| 5,409,978 A | * | 4/1995 | Hamada et al. ............. 524/265 |
| 5,854,343 A | | 12/1998 | Schuster et al. |
| 6,124,392 A | | 9/2000 | Heisler et al. |
| 6,218,495 B1 | * | 4/2001 | Braun et al. .................. 528/14 |
| 6,323,262 B1 | | 11/2001 | Achenbach et al. |
| 6,391,234 B1 | * | 5/2002 | Silvi et al. ................... 264/101 |
| 6,989,120 B2 | * | 1/2006 | Mathur et al. ........... 264/211.21 |
| 2001/0047049 A1 | | 11/2001 | Heisler et al. |
| 2003/0229175 A1 | * | 12/2003 | Mathur et al. ............... 524/588 |

FOREIGN PATENT DOCUMENTS

DE        3 601 324 A1     7/1987

(Continued)

OTHER PUBLICATIONS

Derwent Abstract corres. to EP 1 033 389 [AN 2000-580762].

(Continued)

*Primary Examiner*—David L Sorkin
(74) *Attorney, Agent, or Firm*—Brooks Kushman P.C.

(57) ABSTRACT

A process for preparing organopolysiloxane compositions (A) having a viscosity measured at 25° C. of at least 500 Pa·s., wherein organopolysiloxanes (O) and fillers (F) are mixed and kneaded in a first process stage in a kneading cascade having at least two kneading chambers arranged in series adjacent one another, each containing kneading tools having parallel axes and capable of being driven in co-rotating or counter-rotating directions, the chambers connected to one another by means of openings through which material can pass in a direction transverse to the axes of the kneading tools, with the first kneading chamber having a feed opening and the last kneading chamber having a discharge opening, to give raw mixtures, and the raw mixtures are kneaded and degassed in a reciprocating kneader in a second process stage.

20 Claims, 1 Drawing Sheet

FOREIGN PATENT DOCUMENTS

| | | |
|---|---|---|
| DE | 40 05 823 A1 | 8/1991 |
| DE | 196 17 606 A1 | 11/1997 |
| DE | 199 62 565 A1 | 7/2001 |
| EP | 258159 A1 * | 3/1988 |
| EP | 0 570 387 B1 | 11/1993 |
| EP | 0 807 509 A1 | 11/1997 |
| EP | 0 841 363 A1 | 5/1998 |
| EP | 0 909 777 A2 | 4/1999 |
| EP | 1 033 389 A1 | 9/2000 |
| EP | 1 110 691 A1 | 6/2001 |
| EP | 1 110 696 A2 | 6/2001 |
| EP | 1 158 015 A1 | 11/2001 |
| EP | 1 203 650 A1 | 5/2002 |
| WO | WO 92/13694 | 8/1992 |

OTHER PUBLICATIONS

Derwent Abstract corres. to EP 0 807 509 [AN 1997-537389].
Derwent Abstract corres. to EP 0 570 387 [AN 1992-277301].
English Derwent Abstract corres. to DE 196 17 606 A1, AN 1997-537389 [50].
English Derwent Abstract corres. to DE 26 01 324 A1, AN 1987-206958 [30].
Klöhn, W., "Continuous, Compounding and Extruding Machine"; Plastverabeiter; Zechner and Huethig Publishing Plc. Speyer/Rhein, Germany, vol. 45, No. 10, pp. 90-95 and English Abstract corres. to Klöhn, W., pp. 90-95.
English Derwent Abstract corres. to DE 199 62 565 A1, AN 2001-583738 [66].
English Derwent Abstract corres. to DE 40 05823 A, AN 1991-260784 [36].

* cited by examiner

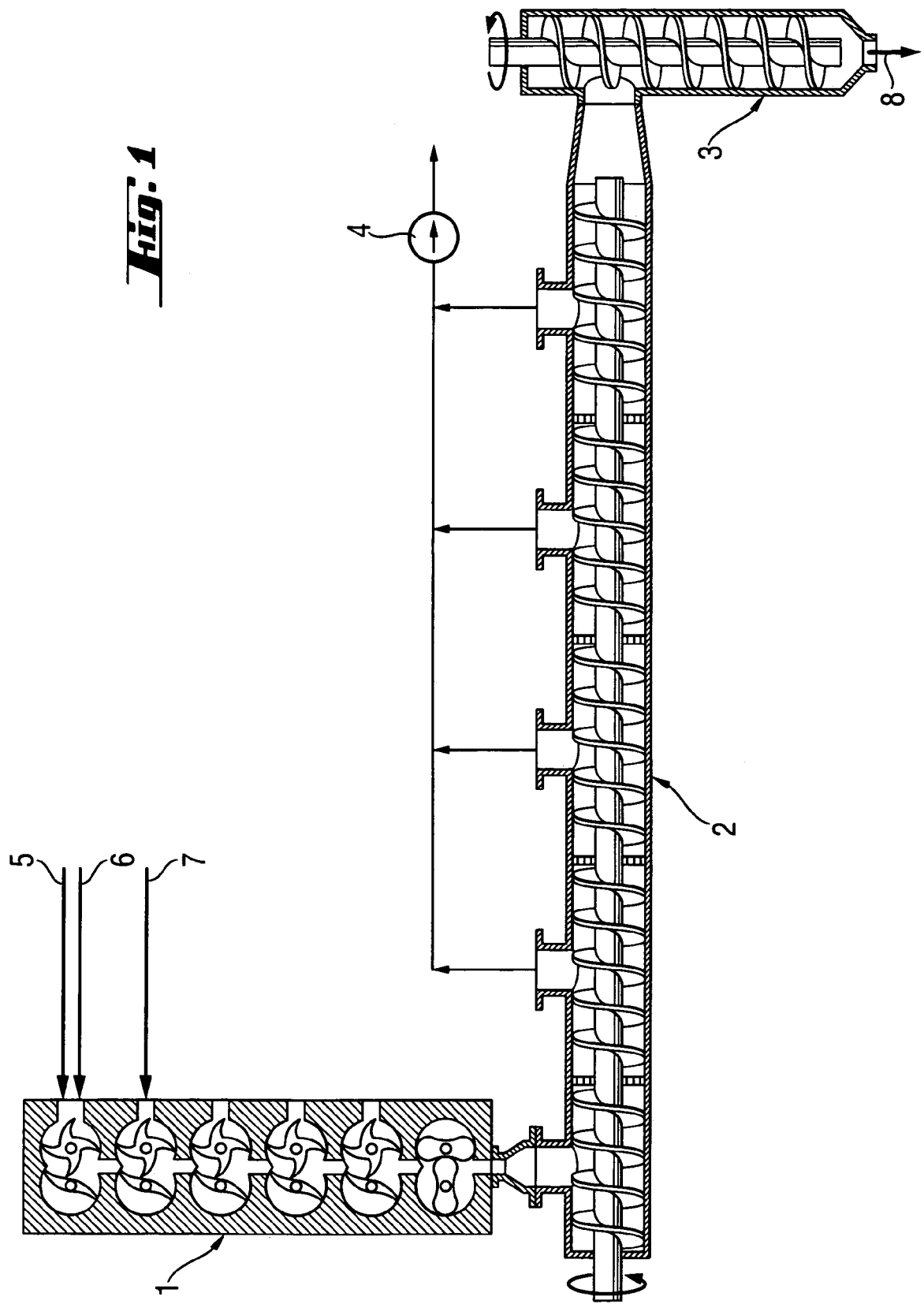

PROCESS FOR THE CONTINUOUS PREPARATION OF HIGH-VISCOSITY SILICONE COMPOSITIONS

BACKGROUND OF THE INVENTION

1. Field of the Invention

The invention relates to a process for preparing organopolysiloxane compositions in a kneading cascade having at least two kneading chambers arranged in series next to one another, followed by a reciprocating kneader.

2. Background Art

EP 570387 A describes a process for the continuous preparation of HTV silicone compositions, in which the incorporation of filler into the polysiloxane and degassing are carried out in one step in a single-screw reciprocating kneader. However, the machine can also be segregated so that the mixing process can take place in the first kneader and the degassing step can take place in the second kneader. Owing to phase inversion, dry friction, and the mechanical destruction of high molecular weight polyorganosiloxanes, the storage stability of the resulting silicone composition is reduced. In addition, satisfactory throughputs cannot be achieved using this type of apparatus.

A further process development is described in EP 1033389 A. To improve storage stability in particular, the process is extended by rubber recirculation which is supposed to prevent phase inversion and thus to reduce the tendency of the HTV compositions prepared in this way to become stiff and brittle. Two-stage processes are not mentioned in EP 1033389 A. The process is complicated in an engineering sense by the recirculation of product, so that economical operation is not possible. In this process, the throughput is also in need of improvement.

EP 1110696 A describes a two-stage process for preparing HTV silicone compositions. In the first stage of this process, mixing of filler, silicone polymer, hydrophobicizing agents, and plasticizers takes place in a co-rotating twin-screw extruder. In the second stage of the process, the mixture is then compounded fully and degassed in a single-screw reciprocating kneader. Compared to EP 570387 A, the process of EP 1110696 A is alleged to be superior in terms of throughput and improved filler distribution. However, EP 570387 A states that twin-screw machines are problematic in terms of machine wear and abrasion of metal and can result in undesirable gray coloration of the HTV compositions. This applies particularly to highly filled, stiff mixtures.

EP 807509 A describes the continuous preparation of storage-stable organopolysiloxane compositions using a specific cascade of kneading machines to provide base compositions for addition-crosslinking liquid rubbers. Degassing of the composition occurs only via a degassing vessel, not by means of a specifically designed machine. According to EP 807509 A, HTV compositions can also be prepared using a kneading cascade. Owing to the lack of opportunities for degassing or unsuitable degassing facilities, HTV rubbers produced by this process are unusable.

SUMMARY OF THE INVENTION

It is an object of the invention to provide a process which avoids the disadvantages of the art. These and other objects are achieved through the use of a kneading cascade allowing for transverse passage of material between kneading tools, followed by a second stage which includes a reciprocating kneader and degasser.

BRIEF DESCRIPTION OF THE DRAWING(S)

FIG. 1 illustrates one embodiment of a two stage high viscosity organopolysiloxane composition preparation in accordance with the invention.

DETAILED DESCRIPTION OF THE PREFERRED EMBODIMENTS

The invention provides a process for preparing organopolysiloxane compositions (A) having a viscosity measured at 25° C. of at least 500 Pa·s., in which organopolysiloxanes (O) and fillers (F) are, in a first process stage, mixed and kneaded in a kneading cascade having at least two kneading chambers which are arranged in series next to one another, each containing two kneading tools having parallel axes and capable of being driven in co-rotating or counter-rotating directions, and which are connected to one another by means of openings through which material can pass in a direction transverse to the axes of the kneading tools, with the first kneading chamber having a feed opening and the last kneading chamber having a discharge opening, to give raw mixtures, and the raw mixtures are kneaded and degassed in a reciprocating kneader in a second process stage.

The process of the invention makes it possible to operate at high throughputs, and the process engineering functions are distributed over two stages, so that better individual optimization of each stage can be achieved. As a result, well-degassed mixtures having only small proportions of residual volatile compounds are obtained, discoloration of the vulcanizates is low, and the risk of bubble formation during extrusion of the organopolysiloxane compositions is minimized. Dry mixtures which do not compact readily can also be produced without problems. When using the same raw materials, the storage stability is improved in comparison with the organopolysiloxane compositions prepared as described in EP 570387 A.

In the process of the invention, each kneading chamber of the kneading cascade has a separate drive, and the intensity of mixing, compacting and kneading can thus be controlled very precisely for each specific chamber. Such precise control is not possible when using a twin-screw machine as described in EP 1110696 A. The rubber composition is completely homogeneous, as is desired for finished rubber, in the last chamber of the kneading cascade at the latest; in addition, the rubber has experienced a kneading effect which has been exerted reproducibly via the drives of the individual kneading chambers.

The kneading cascade used according to the invention is a kneading machine which allows the intensity of the kneading process and the residence time to be controlled, because speed of rotation and direction of rotation of the kneading tools can be set independently in the individual kneading chambers. Since no free gas space is present in the kneading cascade, protective gas can be dispensed with. Discharge of product from the kneading cascade presents no problem because the finished compositions can easily be conveyed to the discharge opening by means of the kneading tools. The last kneading chamber preferably has pumping blades for product discharge.

The kneading cascade preferably comprises a maximum of 10 kneading chambers; 6 chambers or less are normally sufficient. The last chamber preferably has pumping blades for product discharge. The starting materials, namely the fillers (F), organopolysiloxanes (O) and, if desired, additives, can be introduced and admixed into the organopolysiloxane compositions (A) in any order; the filler(s) (F) can, for example, be introduced into one or more chamber(s) of the kneading cascade. Preference is given to introducing all the organopolysiloxane (O) into the first chamber. It is also possible to meter part of the organopolysiloxane (O) into a later chamber, for example to reduce the viscosity of the organopolysiloxane composition (A). The required fillers (F) can be metered into all chambers; preference is given to no filler (F) being introduced into the last chamber. It is possible to add the total amount of filler required only in, for example, one/two/three or four of the first chambers, but distributing the addition of filler over all of the chambers is also possible. If structure improvers (S) are used, they are preferably introduced into one of the first chambers, in particular into the first chamber. Preference is given to no structure improver (S) being introduced into the last chamber. The kneading cascade preferably has at least three, in particular at least five, kneading chambers.

Screens, diaphragm plates or slide valves for restricting the flow of the organopolysiloxane compositions can be installed between individual kneading chambers or all kneading chambers. These elements can be adjustable in terms of their position and the open area left free by them. The residence time in the individual chambers can be influenced in this way. The kneading tools are preferably kneading blades, rollers or polygonal plates.

In addition to the feed opening of the first kneading chamber, the kneading machine is preferably provided with further feed openings which lead into the individual kneading chambers or are located between two kneading chambers. Preference is given to each kneading chamber having a feed opening. In particular, the feed openings of the first 1, 2 or 3 kneading chambers are preferably suitable for the introduction of solids and the other feed openings are preferably provided for the introduction of liquids.

Each kneading chamber preferably has a separately regulatable drive which in each case preferably also is associated with a torque measurement capability. The torque is a measure of the viscosity of the mixture in the chamber.

The kneading chambers are preferably heatable and/or coolable, and in particular can be operated individually at different temperatures. Kneading produces heat of friction which is preferably partly removed by cooling in order to avoid overheating of the composition. The temperatures of the compositions in the kneading chambers in the process of the invention are preferably not more than 280° C., more preferably not more than 240° C.

The kneading tools are preferably mounted free-standing on bearings. The bearing-side wall of the housing is then provided with openings for the drive shafts of the kneading tools. The housing of the kneading chambers preferably has a line of separation running transverse to the axes of the tools, so that the part of the housing opposite the bearings can be moved away from the line of separation and the kneading tools in the direction of the axes of the drive shafts. A kneading machine having such a configuration is particularly easy to clean, and is described in EP 807509 A.

After the last kneading chamber, the rubber is preferably pushed through a short flexible connecting piece directly into the reciprocating kneader, i.e. into the second stage of the process. The function of this process unit is intensive kneading, and at the same time, very effective degassing of the organopolysiloxane composition. In addition, the temperature of the mixture is regulated along the reciprocating kneader, in particular, being preferably kept approximately constant. To meet these requirements, those skilled in the art can make fine adjustments to at least the following parameters for a particular product, especially in the case of large production machines:

rotational speed of the screw,
number and cross section of any orifice plates, with orifice plates whose flow-restricting action can be adjusted from the outside without opening the kneader being very useful,
heating/cooling of the individual barrel sections and the shaft,
equipment on the shaft (shape and number of the kneading elements, transport elements, back-transport elements),
provision of kneading pins and possibly kneading rhombohedra on the barrel sections,
number of vacuum domes required.

Apart from these machine settings, it is necessary to optimize the level of vacuum applied, if applicable also the volume flow of any carrier gas required. The composition temperatures are likewise preferably not more than 280° C., in particular not more than 240° C. If required, further additives (AD), in particular structure improvers (S), can be added in the reciprocating kneader.

In the preparation of the organopolysiloxane composition, the latter runs through both process steps without intermediate storage of product.

The further processing of the then well-kneaded and degassed organopolysiloxane composition is unproblematic and involves conventional processing.

The filler content of the organopolysiloxane compositions (A) is from 5 to 80% by weight, preferably from 10 to 50% by weight. Particular preference is given to preparing organopolysiloxane compositions (A) having a filler content of from 20 to 40% by weight.

Possible fillers (F) are all fillers customarily used in silicone compositions, and it is also possible to use mixtures of various fillers. The suitable fillers (F) are, for example, silicas, carbon black, metal oxides, metal carbonates, metal sulfates, metal nitrides, diatomaceous earth, clays, chalk, mica, metal powders, activated carbon, powders of organic polymers, etc. It is important that the viscosity of the filler-containing organopolysiloxane compositions (A) is, as a result of the filler content, significantly higher than the viscosity of the organopolysiloxane (O) which is to be mixed in a continuous fashion into this filler-containing silicone composition. Preference is given to reinforcing fillers (F), i.e. fillers having a specific surface area determined by the BET method of at least 50 m$^2$/g, preferably 50-500 m$^2$/g, e.g. pyrogenic silica, silica hydrogels which have been dewatered with retention of the structure, i.e. aerogels, other types of precipitated silicon dioxide and also carbon black. The particularly preferred pyrogenic silicas, precipitated silicas and carbon blacks can, if desired, have been subjected to a surface treatment, e.g. to improve their dispersibility. Prehydrophobicized oxidic reinforcing fillers (F) having a carbon content resulting from the hydrophobicization of at least 0.5% by weight are particularly preferred. In particular, silicone resins of the $M_w D_x T_y Q_z$ type which are solid at room temperature in pure form can also be present.

The organopolysiloxanes (O) on which the organopolysiloxane composition (A) is based can be one organopolysiloxane (O) or a mixture of various organopolysiloxanes (O). Basically, all organopolysiloxanes (O) which have been described hitherto and are well known to those skilled in the art for the preparation of HTV, LSR, RTV-1 and RTV-2 compositions can be used. These include linear, branched, cyclic or resin-like organopolysiloxanes which may contain functional groups, usually for the purposes of crosslinkability.

Preference is given to using linear organopolysiloxanes (O) such as polydimethylsiloxanes having a degree of polymerization of from 50 to 9,000. Preferred organic radicals on the organopolysiloxanes (O) are methyl, phenyl, vinyl and trifluoropropyl, most preferably methyl. The functional groups preferably present in the polyorganosiloxanes are —SiOH, —SiOR, Si-vinyl and —SiH, most preferably the vinyl group. Particularly preferred organopolysiloxanes (O) are the organopolysiloxanes (O) which are customarily used for the preparation of thermally curing HTV silicone compositions which have a Brabender value measured at 25° C. of from 200 to 900 daNm, in particular from 400 to 700 daNm. The composition of the organopolysiloxanes (O) preferably corresponds to the average formula (1)

$$R^1_a R^2_b SiO_{(4-a-b)/2} \quad (1),$$

where the radicals $R^1$ are identical or different monovalent Si-bonded radicals selected from among —H, —OH, —OR, where R is a $C_1$-$C_{10}$—hydrocarbon radical, and unsubstituted, halogen-substituted or cyano-substituted $C_1$-$C_{10}$-hydrocarbon radicals which contain at least one aliphatic carbon-carbon multiple bond and may be bound to silicon via a divalent linking group, $R^2$ are identical or different monovalent Si-bonded, unsubstituted, halogen-substituted or cyano-substituted $C_1$-$C_{10}$-hydrocarbon radicals which contain no aliphatic carbon-carbon multiple bonds, a is a non-negative number in the range from 0 to 1, and b is a non-negative number in the range from 1 to 2.1.

$R^1$ is preferably an alkenyl group which is able to react with an SiH-functional crosslinker or with a peroxide. Alkenyl groups having from 2 to 6 carbon atoms, e.g. vinyl, allyl, methallyl, 1-propenyl, 5-hexenyl, ethynyl, butadienyl, hexadienyl, cyclopentenyl, cyclopentadienyl, cyclohexenyl, preferably vinyl and allyl, are usually used.

Organic divalent linking groups via which the alkenyl groups may be bound to silicon of the polymer chain comprise, for example, oxyalkylene units such as those of the formula (2)

$$-(O)_p[(CH_2)_q O]_r- \quad (2)$$

where p is 0 or 1, preferably 0, q is from 1 to 4, in particular 1 or 2, and r is from 1 to 20, in particular from 1 to 5.

The oxyalkylene units of the formula (2) are bound at the left-hand end to a silicon atom. The radicals $R^1$ can be bound to the polymer chain in any position, in particular at the terminal silicon atoms.

$R^2$ preferably has from 1 to 6 carbon atoms. Particular preference is given to methyl and phenyl.

The structure of the polyorganosiloxanes of the formula (1) can be linear, cyclic or branched. The content of trifunctional and/or tetrafunctional units which lead to branched polyorganosiloxanes is typically very low, preferably not more than 20 mol %, in particular not more than 0.1 mol %.

Particular preference is given to using polydimethylsiloxanes which contain vinyl groups and whose molecules have the formula (3)

$$(ViMe_2SiO_{1/2})_c(ViMeSiO)_d(Me_2SiO)_e(Me_3SiO_{1/2})_f \quad (3)$$

where Vi is a vinyl radical and Me is a methyl radical, and the non-negative integers c, d, e and f obey the following relationships: $c+d \geqq 1$, $c+f=2$, $1000<(d+e)<9000$, preferably $3000<(d+e)<7000$, and $0<(d+1)/(d+e)<1$, preferably $0<(d+1)/(d+e)<0.1$.

The organopolysiloxane compositions (A) can further comprise additives (AD) which make it possible to obtain specific properties, in particular processing aids such as structure improvers (S); dispersants; hydrophobicizing agents, for example silazanes or silanol-containing oligosiloxanes; destructuring agents; plasticizers; also dye and pigment additives, inhibitors; accelerators; catalysts, for example Pt-containing hydrosilylation catalysts; crosslinkers, for example SiH-containing siloxanes or peroxides; coupling agents, heat stabilizers, antioxidants, etc. Particularly preferred additives are hydrophobicizing agents which aid incorporation of hydrophilic fillers (F) such as hydrophilic pyrogenic or precipitated silica, e.g. silanol-containing oligosiloxanes and organodisilazanes, and also trimethylsilyl-terminated oligodimethylsiloxanes.

As structure improvers (S) preference is given to organopolysiloxanes having a viscosity measured at 25° C. of from 10 to 200 mPa·s, in particular from 20 to 150 mPa·s. Silanol-containing oligosiloxanes and trimethylsilyl-terminated dimethyl(oligo or poly)siloxanes are preferred. The radicals of the organopolysiloxanes used as structure improvers (S) are preferably selected from among methyl, phenyl, vinyl and hydroxyl groups.

The organopolysiloxane compositions (A) prepared by the process of the invention are relatively high-viscosity silicone compositions having a viscosity measured at 25° C. of at least 500 Pa·s. The process of the invention is particularly useful for preparing relatively high-viscosity organopolysiloxane compositions (A) having a Brabender plasticity measured at 25° C. of from 100 to 1,000 daN·m, and also very high-viscosity organo-polysiloxane compositions (A) having a viscosity determined by the method of Mooney of from 10 to 200 Mooney units (final Mooney value, ML(1+4), 23° C., DIN 53523).

The process of the invention is particularly useful for preparing highly filled, high-viscosity organopolysiloxane compositions (A) such as heat-curable HTV compositions, high-viscosity silicone pastes and highly filled silicone masterbatches. The heat-curable HTV compositions can also be base mixtures which are used to produce ready-to-use crosslinkable HTV compositions. The HTV compositions produced can be, for example, HTV compositions which crosslink peroxidically, crosslink by means of Pt-catalyzed addition reactions or crosslink as a result of a condensation reaction or high-energy radiation.

All the symbols in the formulae above and in the claims have their meanings independently of one another.

In the following examples, all amounts and percentages are by weight and all pressures are 0.10 MPA (abs.), unless indicated otherwise. All viscosities were determined at 20° C.

All the examples which demonstrate the process of the invention and the comparative examples were carried out using a silicone rubber composition comprising the following constituents as a basis:

Solid HTV Polymer:

100 parts by weight of a solid HTV polymer which has a viscosity of about 20,000 Pa·s at a temperature of 25° C. and a shear rate of 0.81 1/ sec and, according to the $^1$H NMR spectrum, has the following number-average composition:

$$Vi\text{-}Si(Me)_2\text{—}[OSi(Me)_2]_m\text{—}[OSiMeVi]_n\text{—}OSi(Me)_2\text{-}Vi,$$

where Me is the methyl radical and Vi is the vinyl radical, n+m is about 6,000 and m/n is about 3,000.

Structure Improver:

16.7 parts by weight of a structure improver which, according to the $^{29}$Si NMR spectrum, has the following number-average composition:

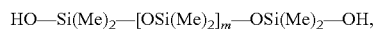

HO—Si(Me)$_2$—[OSi(Me)$_2$]$_m$—OSi(Me)$_2$—OH, where m is about 14 and the viscosity measured at a temperature of 25° C. is 41 mm$^2$/s.

Silica:

50 parts by weight of a pyrogenic silica which is obtainable under the trade name Wacker HDK® T30 and has a specific surface area measured by the BET method of 300 m$^2$/g.

EXAMPLE 1

Process of the Invention

The process is described with reference to FIG. 1: The 1st stage was carried out using a Conterna® kneading cascade 1 from IKA Maschinenbau Janke & Kunkel GmbH & Co. KG, Staufen. The kneading cascade 1 had six chambers each having a volume of 10 l. The total throughput was 200 kg/h.

The polymer 5 (120 kg/h) and the structure improver 6 (20 kg/h) were metered into the first chamber and the filler 7 (60 kg/h) was metered into the second chamber. The total throughput was therefore about 200 kg/h. The rotational speeds in the first four chambers were 35 rpm. Recording the power drawn by the individual drives of the chambers showed that the composition had a lumpy consistency in the 2nd and 3rd kneading chambers. In the 4th kneading chamber, the power drawn was steadier and higher: a homogeneous cohesive composition was present here. Chambers 1-4 were operated at 35 rpm. In chambers 5 and 6, further kneading took place at 40 rpm and at the same time the product was discharged from chamber 6. The 6 chambers were not cooled and not heated, and the temperatures ranged from about 45° C. in the 1st chamber to about 150° C. in the 6th chamber.

Without intermediate storage, the raw mixture was conveyed to a model LR 100/19D kneader 2 from "Buss Compounding Systems AG". Since the dimensions of the two parts of the plant were not matched, the product stream had to be divided in a ratio of 120:80. This was carried out using a slit die which divided the product stream into the desired mass flows by means of a welded-in divider. 80 kg/h were discharged (sample C1, not according to the invention). The remaining 120 kg/h of rubber were fed into the kneader 2 and the 2nd process step according to the invention was verified.

The kneader 2 was divided into five zones (barrel sections) having the following configuration: 1st zone 3D, 2nd-5th zones each 4D. All zones were separated from one another by orifice plates. A reduced pressure of 100 mbar (abs.) was applied in the second through fifth zones by means of a water-ring vacuum pump 4. The heating of the individual barrel sections and the shaft of the kneader 2 were chosen such that, commencing from the 2nd zone a product temperature along the kneader 2 of about 180-200° C. was established at a screw speed of 150 rpm. The raw mixture produced in the kneading cascade 1 was fed at a product temperature of about 150° C. into the first zone 1 of the kneader 2. It was intensively kneaded in the second through fifth zones and volatile constituents were thus optimally removed from the rubber composition. Additives (AD) can be introduced into the 2nd-5th barrel sections ("zones"). The rubber 8 was discharged via a cooled discharge screw 3 and was examined as sample 2 according to the invention.

EXAMPLE 2

Process Not According to the Invention (as Described in EP 1033389 A1, Example 1)

The experiments were carried out using a model LR 100/19D kneader 2 (as shown in FIG. 1) from "Buss Compounding Systems AG". 30 kg/h of polymer and 5 kg/h of structure improver were metered into the 1st barrel section of the kneader 2. In the 2nd barrel section, 15 kg/h of finely divided silica (FDS) were fed into the kneader 2. The 3rd to 5th barrel sections served as kneading and degassing zone. A vacuum produced by means of a water-ring pump 4 was applied. The temperature of the silicone rubber composition at a screw speed of 180 rpm was regulated by heating the shaft and the individual sections of the barrel so that the temperatures measured at the temperature measurement points of the kneader 2 were about 150° C./200° C./180° C. The product was discharged from the kneader via a short downstream discharge screw 3. The product stream downstream of the discharge screw was divided by means of a slit die provided with a divider, with 50 kg/h being discharged as unstrained silicone rubber composition (sample 3 not according to the invention) and the remaining 16 kg/h being returned via a conveyor belt to the 1st barrel section of the kneader.

EXAMPLE 3

Process Not According to the Invention (as Described in EP 1033389 A1, Example 3)

The kneader 2 was supplied with the amounts of starting materials (solid HTV polymer, structure improver, silica) conforming to the formulation of example 2 so that a throughput of 50 kg/h resulted. A temperature profile comparable to that of example 2 was set by means of appropriate wall and shaft heating. The product (sample C4 not according to the invention) was discharged from the kneader via a short downstream discharge screw 3.

Testing of the Silicone Rubber Compositions Produced

The storage stability of the samples 1-4 was assessed over a period of 3 months, i.e. measurement of the Mooney viscosity at defined time intervals, and assessment of the behavior on a roll mill. The table shows only the qualitative assessment of the samples after 3 months. In addition, the volatiles content of the unvulcanized rubber was measured at 200° C. Conditions: 1 g of rubber/4 h/200° C., reported in % of volatile constituents.

The rubber was vulcanized
  a) by means of 0.7% of dicumyl peroxide (crosslinker 1) for 15 minutes at 165° C., or
  b) by means of 1.5% of di(2,4-dichlorobenzoyl) peroxide (50% pure) (crosslinker 2) for 10 minutes at 135° C. between plates in a heatable press. The vulcanizates were subsequently heated at 200° C. for 4 hours in a convection oven, and the appearance of these vulcanizates, i.e. the degree of discoloration, was then assessed.

1=not discolored, 4=strongly discolored

| Sample | Storage Stability | Volatiles | Discoloration of the Vulcanizates | |
|---|---|---|---|---|
| | | | Crosslinker 2 | Crosslinker 1 |
| C1* | average | 1.9% | 3 | 4 |
| 2 | good | 0.5% | 1 | 1-2 |
| C3* | good | 1.4% | 1-2 | 2-3 |
| C4* | poor | 1.3% | 1-2 | 2-3 |

*not according to the invention

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A continuous process for preparing HTV-organopolysiloxane compositions (A) having a viscosity measured at 25° C. of at least 500 Pa·s., comprising mixing and kneading organopolysiloxanes (O), fillers (F), and optionally a structure improver in a first process stage in a kneading cascade having at least two kneading chambers which are arranged in series adjacent one another, each containing two kneading tools having parallel axes and capable of being driven in co-rotating or counter-rotating directions, said chambers connected to one another by means of openings through which material passes in a direction transverse to the axes of the kneading tools, at least the first kneading chamber having a feed opening and the last kneading chamber having a discharge opening, to provide a raw organopolysiloxane mixture, and directly feeding the raw organopolysiloxane mixture from the discharge opening into a reciprocating kneader wherein the raw mixture is kneaded and degassed.

2. The process of claim 1, wherein the kneading cascade comprises from 3 to 10 kneading chambers.

3. The process of claim 2, wherein the kneading tools of the kneading cascade comprise one or more of kneading blades, rollers, or polygonal plates.

4. The process of claim 2, wherein the temperature of the mixture along the reciprocating kneader is regulated by means of orifice plates whose flow-reducing action can be adjusted from the outside without opening the kneader.

5. The process of claim 1, wherein the kneading tools of the kneading cascade comprise one or more of kneading blades, rollers, or polygonal plates.

6. The process of claim 5, wherein the temperature of the mixture along the reciprocating kneader is regulated by means of orifice plates whose flow-reducing action can be adjusted from the outside without opening the kneader.

7. The process of claim 1, wherein the temperature of the mixture along the reciprocating kneader is regulated by means of orifice plates whose flow-reducing action can be adjusted from the outside without opening the kneader.

8. The process of claim 1, wherein the filler content of the organopolysiloxane compositions (A) is from 5 to 80% by weight.

9. The process of claim 1, wherein silicas having a specific surface area determined by the BET method of at least 50 $m^2/g$ are used as fillers (F).

10. The process of claim 1, wherein polydimethylsiloxanes of the formula (3)

$$(ViMe_2SiO_{1/2})_c(ViMeSiO)_d(Me_2SiO)_e(Me_3SiO_{1/2})_f \quad (3)$$

where Vi is a vinyl radical and Me is a methyl radical, and the non-negative integers c, d, e and f obey the following relationships: $c+d \geq 1$, $c+f=2$, $1000 < (d+e) < 9000$, and $0 < (d+1)/(d+e) < 1$, are used as organopolysiloxanes (O).

11. The process of claim 1, wherein polydimethylsiloxanes of the formula (3)

$$(ViMe_2SiO_{1/2})_c(ViMeSiO)_d(Me_2SiO)_e(Me_3SiO_{1/2})_f \quad (3)$$

where Vi is a vinyl radical and Me is a methyl radical, and the non-negative integers c, d, e and f obey the following relationships: $c+d \geq 1$, $c+f=2$, $3000 < (d+e) < 7000$, and $0 < (d+1)/(d+e) < 0.1$, are used as organopolysiloxanes (O).

12. The process of claim 1, wherein organopolysiloxanes having a viscosity measured at 25° C. of from 10 to 200 mPa·s are added as structure improvers (S).

13. The process of claim 1, wherein said filler is a prehydrophobicized filler.

14. The process of claim 1, wherein in both said kneading cascade and said reciprocating kneader, the composition is maintained at a temperature of 280° C. or less.

15. The process of claim 1, wherein organopolysiloxane, untreated filler and hydrophobicizing agent are added to chamber(s) of the kneading cascade.

16. The process of claim 1, wherein organopolysiloxane, untreated filler, and structure improver are added to chamber(s) of the kneading cascade.

17. The process of claim 16, wherein no structure improver is added to a last chamber of the kneading cascade.

18. A continuous process for preparing HTV-organopolysiloxane compositions (A) having a viscosity measured at 25° C. of at least 500 Pa·s., comprising mixing and kneading organopolysiloxanes (O), untreated fillers (F), and optionally a structure improver in a first process stage in a kneading cascade having at least two kneading chambers which are arranged in series adjacent one another, each containing two kneading tools having parallel axes and capable of being driven in co-rotating or counter-rotating directions, said chambers connected to one another by means of openings through which material passes in a direction transverse to the axes of the kneading tools, at least the first kneading chamber having a feed opening and the last kneading chamber having a discharge opening, to provide a raw organopolysiloxane mixture, and directly feeding the raw organopolysiloxane mixture from the discharge opening into a reciprocating kneader wherein the raw mixture is kneaded and degassed and wherein the raw organopolysiloxane mixture is a viscous, homogenous, cohesive composition prior to entry into the reciprocating kneader.

19. A continuous process for preparing HTV-organopolysiloxane compositions (A) having a viscosity measured at 25° C. of at least 500 Pa·s., comprising mixing and kneading organopolysiloxanes (O), untreated fillers (F), and at least one of a hydrophobicizing agent or structure improver in a first process stage in a kneading cascade having at least two kneading chambers which are arranged in series adjacent one another, each containing two kneading tools having parallel axes and capable of being driven in co-rotating or counter-rotating directions, said chambers connected to one another by means of openings through which material passes in a direction transverse to the axes of the kneading tools, at least the first kneading chamber having a feed opening and the last kneading chamber having a discharge opening, to provide a raw organopolysiloxane mixture, and directly feeding the raw organopolysiloxane mixture from the discharge opening into a reciprocating kneader wherein the raw mixture is kneaded and degassed.

20. The process of claim 19, wherein a structure improver is employed and is a silanol-functional organopolysiloxane, and the filler comprises an untreated hydrophilic filler.

* * * * *